(12) United States Patent
Kim

(10) Patent No.: US 7,145,435 B2
(45) Date of Patent: Dec. 5, 2006

(54) SECURITY SYSTEM USING A TRANSMITTING SIGNAL OF A WIRELESS COMMUNICATION TERMINAL AND A METHOD FOR USING THE SAME

(76) Inventor: Sug-Bae Kim, 207-1206 Samik New Town Apt. 308-11 Naedang-dong, Seo-gu, Daegu-shi 703-060 (KR)

( * ) Notice: Subject to any disclaimer, the term of this patent is extended or adjusted under 35 U.S.C. 154(b) by 0 days.

(21) Appl. No.: 10/275,617

(22) PCT Filed: Mar. 8, 2002

(86) PCT No.: PCT/KR02/00407

§ 371 (c)(1),
(2), (4) Date: Apr. 16, 2003

(87) PCT Pub. No.: WO02/071688

PCT Pub. Date: Sep. 12, 2002

(65) Prior Publication Data
US 2003/0164750 A1 Sep. 4, 2003

(30) Foreign Application Priority Data
Mar. 8, 2001 (KR) .............................. 2001/12047

(51) Int. Cl.
*G05B 19/00* (2006.01)
(52) U.S. Cl. ............... 340/5.6; 340/426.18; 455/404.1; 307/10.3

(58) Field of Classification Search ................. 340/5.6, 340/5.61, 5.64, 5.23, 5.1, 5.24, 7.1, 7.2, 7.39, 340/426.21, 426.2, 426.18; 455/404.1; 307/10.3
See application file for complete search history.

(56) References Cited

U.S. PATENT DOCUMENTS 5,422,634 A * 6/1995 Okubo ...................... 340/5.24
5,844,495 A * 12/1998 Griessbach ................ 340/5.26
6,049,289 A * 4/2000 Waggamon et al. ....... 340/5.23

FOREIGN PATENT DOCUMENTS

| JP | 06-53956 | 2/1994 |
| JP | 11-187016 | 7/1999 |
| KR | 1998-071481 | 10/1998 |

* cited by examiner

*Primary Examiner*—Brian Zimmerman
*Assistant Examiner*—William Bangachon
(74) *Attorney, Agent, or Firm*—John K. Park; Park Law Firm

(57) ABSTRACT

A security system using a transmitting signal of a wireless communication terminal and a method using the same are disclosed. In order for security certification, a specific information and numerical information included in the signal transmitted for dialing from the wireless communication terminal are compared with the specific information and numerical information that have been stored in advance. The present invention provides convenience in security certification, and has an advantage in that double the security can be realized.

2 Claims, 5 Drawing Sheets

SECURITY SYSTEM USING A TRANSMITTING SIGNAL OF A WIRELESS COMMUNICATION TERMINAL AND A METHOD FOR USING THE SAME

BACKGROUND OF THE INVENTION

1. Field of the Invention

The present invention relates to a security system using a signal transmitted from a wireless communication terminal and a security method using the same, and more specifically to a security system using a signal transmitted from a wireless communication terminal and a security method using the same, in which specific information and numerical information included in the signal transmitted for dialing from the wireless communication terminal are compared with the information that has been stored in advance, and the security certification is performed in accordance with the comparison result.

2. Description of Related Art

As industry has developed, certification in accessing private information has become important, and a high level of security of high fidelity is required.

In general, a certification system or a security system uses a secret number of an account or a card in trading with a financial institution. The secret number generally consists of four numbers only, so the possibility of appropriation of the secret number or duplication of the card is very high. Accordingly, for high-level security, security systems using a fingerprint, an iris, the shape of a vein, DNA or a weight of a human body have been proposed. However, in order to realize such security systems, a significant amount of data must be established about the fingerprint, the iris, the shape of a vein, DNA or the weight of human body, and the information has to be divided in detail to provide the security system of high fidelity without any malfunction.

Moreover, due to the significant amount of data, a large amount of time is consumed in inputting the data and a greater capacity of the security system is required. Furthermore, since a part of body is used as an input method may feel inconvenience, and sanitary problems may be caused by the indirect contact with many other people.

In order to solve such a problem, it is preferable if the security system is implemented with a wireless communication terminal that which is quite popular as of late.

In general, communication using a mobile communication system connects a moving object such as a car, a ship, an aircraft or a train, with a stationary object or another moving object, in order to transmit voice data as well as visual information.

Such a mobile communication service is provided by a Personal Communication Service (hereinbelow, referred to as "PCS"), CT-2, Trunked Radio System (hereinbelow, referred to as a "TRS"), and a wireless communication, which provide rapid and wide-ranging service with upgraded mobility making up for the shortcomings of conventional mobile phones or pagers.

In particular, unlike conventional communication methods where each of the users uses a specific frequency exclusively, TRS communication is a communication method where a great number of subscribers can use a plurality of frequencies together. According to TRS communication, between 150 and 200 subscribers can use a single channel due to efficiency in using the frequencies and high economy. Further, the TRS communication method can provide a variety of services during communication since the channel can be occupied for a certain time period, and provide high performance in communication in providing security compared with conventional wireless communication methods.

The TRS communication method has a shortcoming in that communication time must be restricted as many subscribers use the limited number of frequencies, however, the communication reach is great reaching 20 to 30 kilometers in comparison with a cellular type communication methods, and a small number of repeaters are needed to reduce the investment costs, so the use of the TRS communication method is increasing.

The mobile communication system providing such a wireless communication terminal is illustrated in FIG. 1. As shown in the figure, the mobile communication system is comprised of a repeater 7, a private exchange 3 and a public exchange network 1. The repeater 7 re-transmits the signal transmitted to/from a plurality of terminals 9a to 9n such as a wireless communication terminal or a PCS after amplifying the received signal to a certain level. The private exchange 7 allots the signal transmitted from the repeater 7 to a communication channel such as an inner line or a local line for a certain period of time, performs the transfer of the information about the repeater 7 or the subscribers stored in a subscriber management unit 5, and controls the terminals 9a to 9n and the repeater 7. The public exchange network 1 connects the signal transmitted from the private exchange 3 to a public communication network.

Here, the subscriber management unit 5 manages the information about the terminals 9a to 9n and the users of the terminals 9a to 9n.

The public exchange network 1 includes an exchange and a mobile telephone exchange station, which connects general subscribers with the terminal users or connects the terminal users with each other.

In the mobile communication system having the above-described construction, the process of communication using the terminals is illustrated in FIG. 2.

FIG. 2 illustrates the flow of the signal, which shows the communication process between the terminal and the private exchange. At first, the terminal is maintained on stand-by mode to receive the control signal from the repeater 7 while the terminal is not used for communication. In such a situation, bilateral communication is not performed between the repeater 7 and terminals 9a to 9n.

Afterwards, when the power of the terminal is turned on, the terminal searches the nearest repeater which is detected to transmit the strongest possible signal in the location of the terminal, and refers the coverage of the repeater registered in the program of the terminal.

Then, the terminal transmits the registered information of the terminal and the specific information ID of the terminal, which have been registered in the program of the terminal, and the repeater 7 re-transmits the data to the private exchange 3 in which the information of the terminal and the users of the terminal are stored in advance.

The private exchange 3 receives the data, and searches the information about the terminal through the subscriber management unit 5 which stores and manages the information about the terminal, which is ON.

If the information about the terminal is determined to be the terminal managed in the exchange during the searching process, the terminal transmits the data to the repeater to inform that the terminal that it is located within the coverage of the repeater 7, and then the repeater 7 transmits a confirmation message to the terminal.

As described above, in order to communicate with the terminal, each of the terminals transmits specific information of its own to the repeater 7, and the repeater 7 transmits the data to private exchange 3 to secure a communication channel by searching the terminal information in the subscriber management unit 5.

SUMMARY OF THE INVENTION

The present invention has been proposed to overcome the above-mentioned problems, and accordingly, it is the object of the present invention to provide a security system which performs security certification by receiving specific number information included in the signal transmitted for dialing from a wireless communication terminal, and compares the specific information and numerical information with those stored in advance.

In order to achieve the above object, the present invention provides a security system using a signal transmitted from a wireless communication terminal, comprising: a receiving unit for receiving the signal transmitted from the wireless communication terminal; a storage unit for storing a specific information of the wireless communication terminal and an encryption code; a control unit for determining whether the specific information and a numerical information included in the signal received by the receiving unit are consistent with the specific information and the encryption code stored in the storage unit; a security setup unit for setting up and canceling the security status in accordance with the results of the control unit; and a setup key for storing the specific information and the encryption code of the wireless communication terminal to the storage unit and setting up operation of the control unit.

Further, the security method using a signal transmitted from a wireless communication terminal according to the present invention, comprises the steps of: inputting the specific number of the wireless communication terminal of a certified user and an encryption code set by a user; storing the specific number of the wireless communication terminal and the encryption code to a storage unit; receiving the signal transmitted from the wireless communication terminal; extracting the specific number and the encryption code from the received signal; comparing the extracted information and the extracted encryption code with the specific information and the encryption code stored in the storage unit; and setting up or canceling the security status by operating a security setup unit when the results are consist in the comparing step.

It is preferable that the security method of the present invention further comprise the step of setting up the security status by operating the security setup unit through a setup key.

According to the present invention, by transmitting not only the secret number but also the encryption code for setting up or canceling the security status when the telephone number for dialing is inputted or a short message service is used, the security status can be set up or canceled when the specific information from the wireless communication terminal and the encryption code transmitted from the wireless communication terminal are identical to those stored in the storage unit in advance.

BRIEF DESCRIPTION OF THE DRAWINGS

The above-mentioned objects and other features of the present invention will be more apparent by describing the preferred embodiment of the present invention by referring to the appended drawings, in which.

DETAILED DESCRIPTION OF THE EMBODIMENTS

Figure 1:
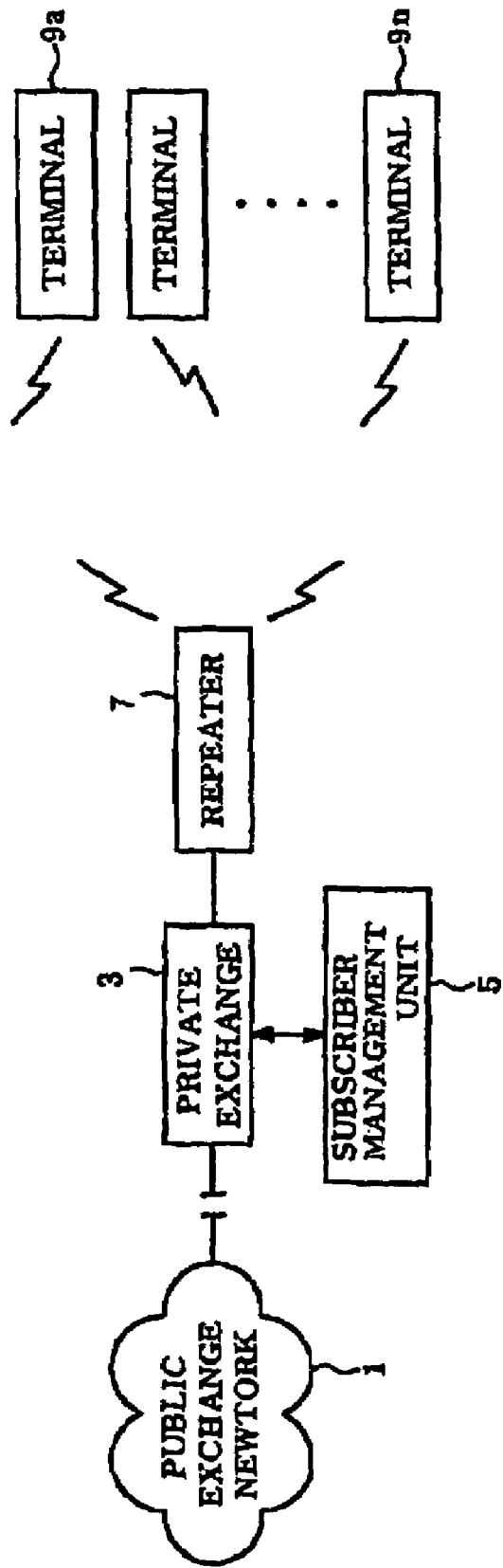
FIG. 1 is a block diagram of a system for performing wireless communication with a general wireless communication terminal.
Figure 2:
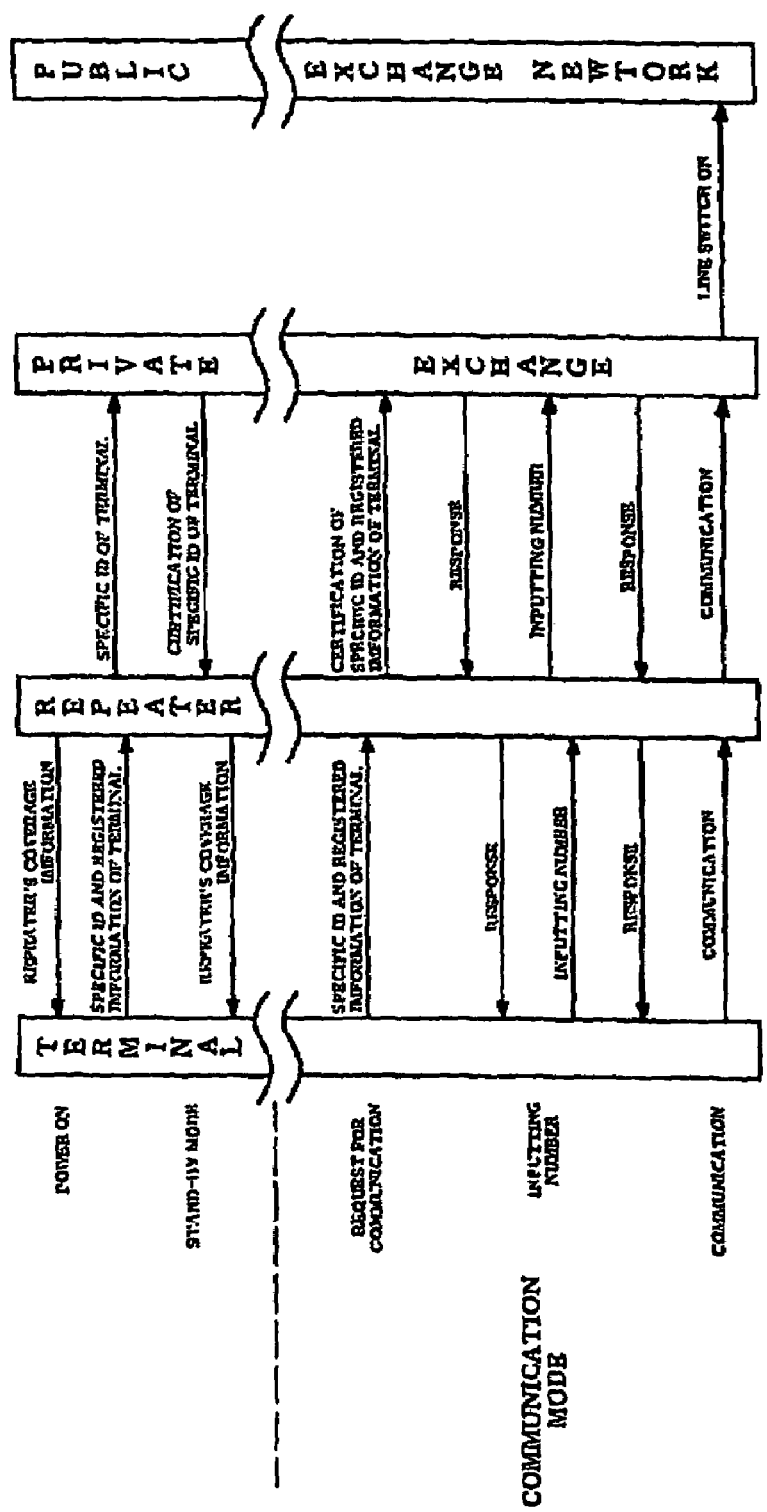
FIG. 2 illustrates the flow of the signal, which shows the communication process between the wireless communication terminal and the private exchange.

Hereinbelow, a preferred embodiment of the present invention will be described in detail with reference to the accompanying drawings. The preferred embodiment of the present invention does not limit the scope of the present invention, but is only an example of the present invention, and the same elements as those of the prior art are referred to with the same reference numerals.

Figure 3:
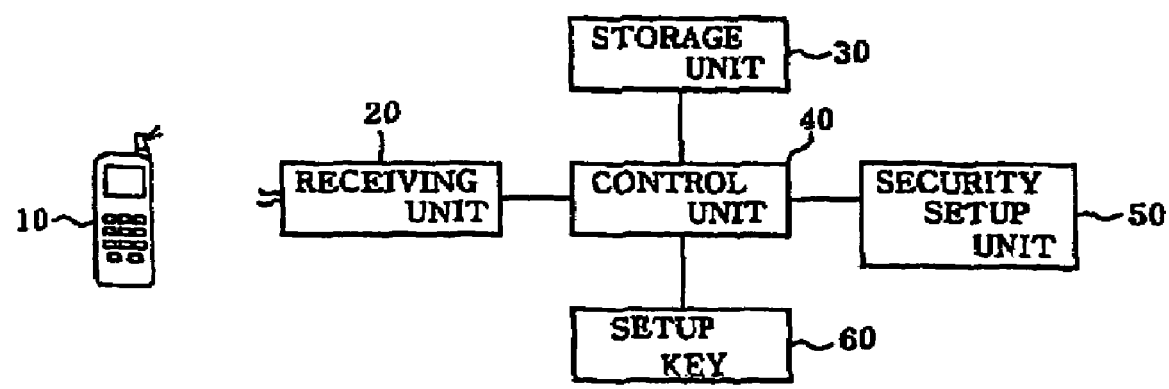
FIG. 3 is a block diagram of the security system using the signal transmitted from the wireless communication terminal according to the present invention.

FIG. 3 is a block diagram of the security system using the signal transmitted from the wireless communication terminal according to the present invention.

As shown in the figure, the security system according to the present invention is comprised of a receiving unit 20 for receiving the signal transmitted from the wireless communication terminal 10, a storage unit 30 for storing a specific information of the wireless communication terminal 10 and an encryption code, a control unit 40 for determining whether the specific information and number information included in the signal received by the receiving unit 20 are consistent with the specific information and the encryption code stored in the storage unit 30, a security setup unit 50 for setting up and canceling the security status in accordance with results of the control unit 40, and a setup key 60 for storing the specific information and the encryption code of the wireless communication terminal 10 to the storage unit 30 and setting up operation of the control unit 40.

Figure 4:
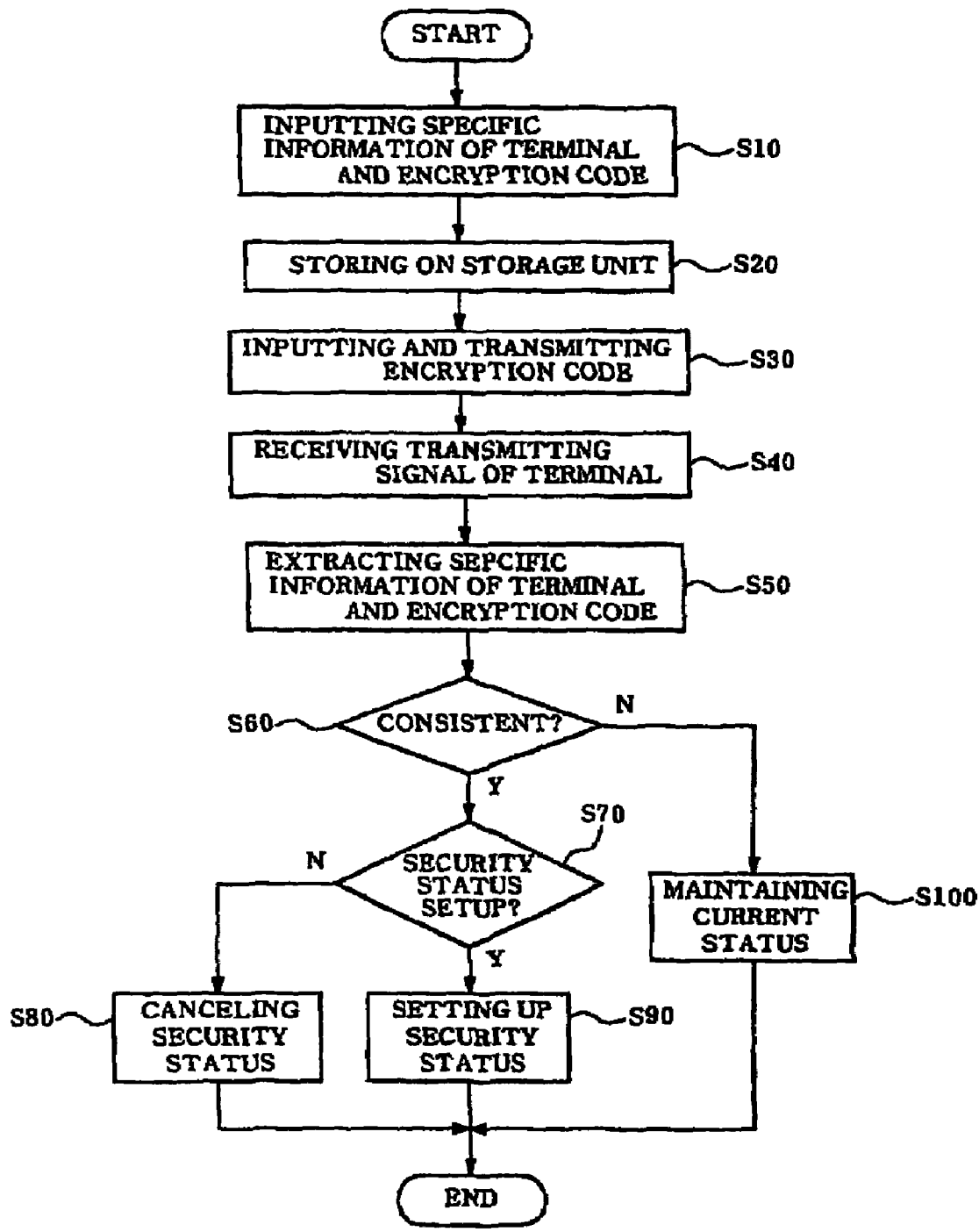
FIG. 4 is a flow chart illustrating the security method using the signal transmitted from the wireless communication terminal according to the present invention.
Figure 5:
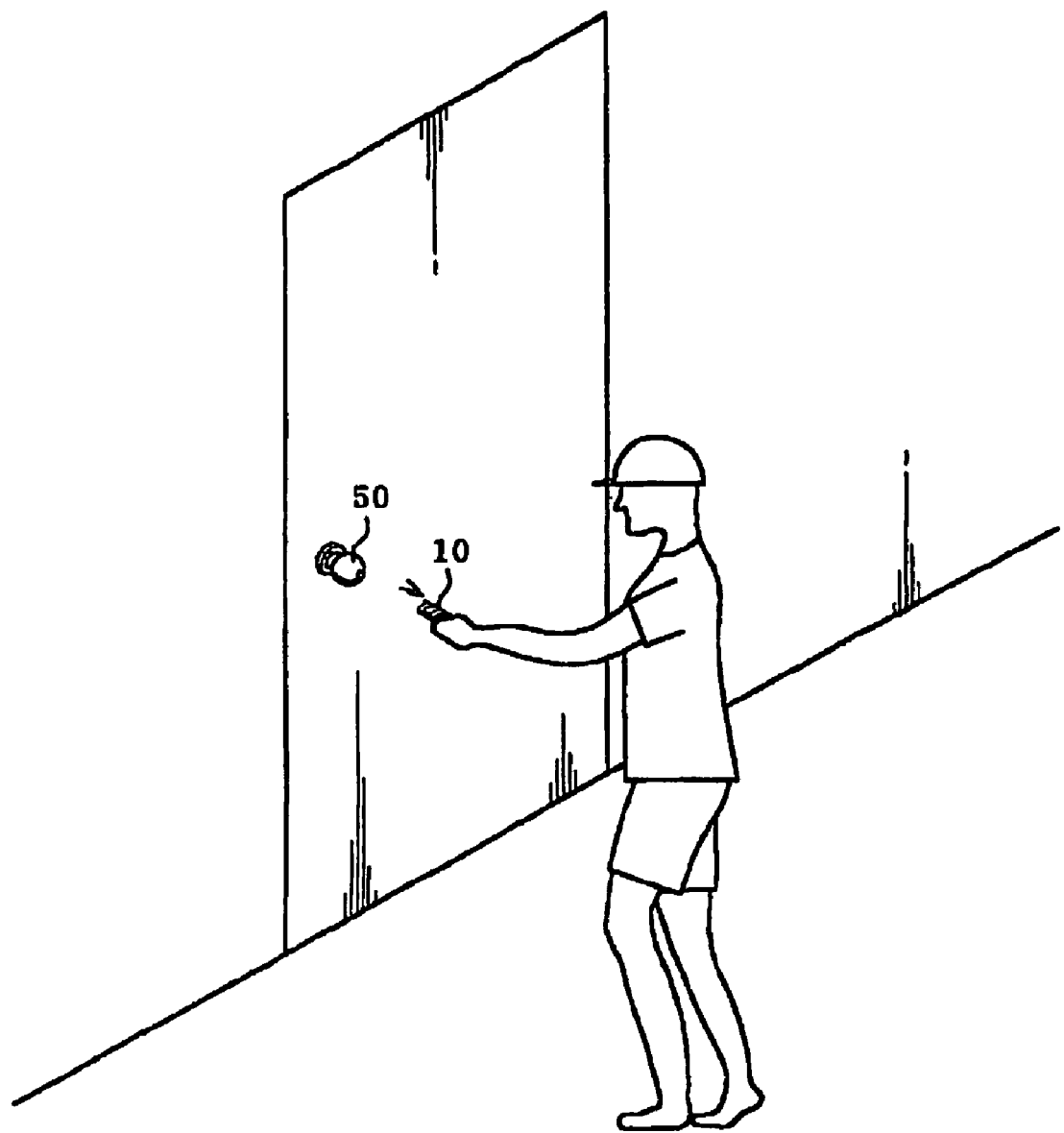
FIG. 5 illustrates how the security system using the signal transmitted from the wireless communication terminal according to the present invention is adopted to an entrance.

The process performed by the present invention is described with reference to FIG. 4 which is a flow chart for illustrating the security method using the signal transmitted from the wireless communication terminal according to the present invention, and FIG. 5 which illustrates the state that the security system using the signal transmitted from the wireless communication terminal according to the present invention is adopted to an entrance.

At first, the wireless communication terminal is converted to an input mode by manipulating the setup key in order to input a variety of contents to the security system. (S10) The contents include the specific information of the wireless communication terminal 10 certified by the security system, the encryption code, which is the secret number corresponding to the telephone number of the other party, characters used in short message service for sending a character message, and the telephone number of the other party to receive the signal. The transmitted contents are stored in the storage unit.

Here, the specific information, that is, the specific number of the wireless communication terminal 10 is a unique number used for distinguishing the wireless communication terminal 10 from a large number of electric waves radiating in the air.

The encryption code is the number corresponding to the telephone number of the other party. The encryption code consists of a maximum 32 numbers, which provides approximately $10^{32}$ cases, used in setting up or canceling the security status. Further, the encryption code can be transmitted while being included in the character message, and in such a situation, the number of the encryption code can be more approximate to infinity since characters 40 through 64 characters can be inputted in the Korean alphabet Han-gul, and characters 80 through 128 can be inputted in a Roman alphabet or numbers.

Therefore, the security is guaranteed unless the secret number is known to other person.

The specific number of the wireless communication terminal and the encryption code is then stored in the storage unit 30. (S20)

In case the security setup unit 50 is used as a lock for an entrance, the user inputs the encryption code in the receiving unit 20 of the security system by using the wireless communication terminal 10, and then makes a phone call by pressing a calling-up button. (S30)

Then, the receiving unit 20 receives the signal transmitted from the wireless communication terminal 10 (S40), and extracts the specific information of the wireless communication terminal 10 and the encryption code from the transmitted signal. (S50)

Then, the extracted information and encryption code are compared with the information and the encryption code stored in the storage unit 30.

If the results are consistent, the security setup unit 50 is operated to setup or cancel the security status.

In other words, the security status can be set up or canceled by analyzing the encryption code (S70), so the security status is set up when the encryption code is determined to be a setup code (S90), and is canceled when it is determined to be a cancel code (S80).

However, when the specific information of the wireless communication terminal 10 and the encryption code are determined not to be identical to those stored in the storage unit 30, the security status set up is maintained. (S100) That is, the security status is maintained when it is set up, and the canceled status is maintained when the canceled status is set up.

Meanwhile, in order to set up the security status from the inside, it is possible to use the setup key 60 to operate the security setup unit 50.

The above embodiment shows the example that the security system according to the present invention is used as a lock to the entrance.

However, the security system can be used as a certifying means in using other terminals such as a computer, or in connecting to the main system. That is, the use of the computers can be certified by performing the certification process with the wireless communication terminal, and the connection to the main system can be certified by performing the certification process with the wireless communication terminal.

Furthermore, the security system according to the present invention can be adapted not only to the lock of the entrance but also to the security network in a building, and in such a case, the certification can be performed with a small amount of data when the security network is out of order, and the data stored in the storage unit 30 of the security system can be utilized for certification even when off-line.

As described above, the security system according to the present invention is implemented by using the specific information of the wireless communication terminal, the encryption codes which is up to infinity, and a signal transmitted from the wireless communication terminal, so the user can use the security system conveniently by using the wireless communication terminal, and double security can be maintained.

What is claimed is:

1. A security system adapted to use a signal transmitted from a wireless communication terminal of a certified user for the purpose of dialing as a wireless key, the signal including specific information of the wireless communication terminal and an encryption code corresponding to the telephone number of the other party, comprising:

a receiving unit for directly receiving the signal transmitted from the wireless communication terminal;

a storage unit for previously storing both the specific information and an encryption code of the wireless communication terminal;

a control unit for determining whether the specific information and the encryption code included in the signal received by the receiving unit are identical to the specific information and the encryption code of the wireless communication terminal stored in the storage unit;

a security setup unit for setting up or releasing a security status according to the determination results of the control unit; and a setup key for setting up whether the specific information and the encryption code of the wireless communication terminal are stored in the storage unit and whether the control unit is operated, whereby only when the specific information and the encryption code included in the signal from the wireless communication terminal received by the receiver unit are identical to the specific information and the encryption code of the wireless communication terminal previously stored in the storage unit, the security system is operated depending on the demand of the user.

2. A security method adapted to use a signal transmitted from a wireless communication terminal of a certified user for the purpose of dialing, comprising the steps of:

inputting a specific number of the wireless communication terminal of the certified user and an encryption code set by the user;

previously storing the specific information of the wireless communication terminal of the certified user and the encryption code in a storage unit to set a cipher;

receiving the signal transmitted from the wireless communication terminal;

extracting the specific information of the wireless communication terminal and an encryption code corresponding to the telephone number of the other party from the received signal;

comparing the extracted specific information and the encryption code with the specific information and the endryption code stored in the storage unit; and setting up or releasing a security status by operating a security setup unit using a setup key only when the extracted specific information and the encryption code are identical to the specific information and the encryption code previously stored in the storage unit, whereby only the specific information and the encryption code included in the received signal from the wireless communication terminal are identical to the specific information and the encryption code of the wireless communication terminal previously stored in the storage unit, the security system is operated depending on the demand of the user.

* * * * *